Jan. 21, 1958 D. E. RUECKERT 2,820,734
METHOD OF FORMING PRESSURE SENSITIVE TAPE
Filed Nov. 19, 1954

INVENTOR.
DEAN E. RUECKERT
BY R. G. Story
ATTORNEY

United States Patent Office 2,820,734
Patented Jan. 21, 1958

2,820,734

METHOD OF FORMING PRESSURE SENSITIVE TAPE

Dean E. Rueckert, Mokena, Ill., assignor to Swift & Company, Chicago, Ill., a corporation of Illinois Application November 19, 1954, Serial No. 469,903

5 Claims. (Cl. 154—125)

The present invention is directed to double-face pressure sensitive tape, a method of forming the tape and suitable apparatus for carrying out such a method. More specifically, the present invention is directed to the formation of a double-face pressure sensitive tape having adhesive coatings applied on both faces thereof and provided with sectionalized, readily removable cover tapes for both faces to protect the adhesive coatings prior to the use of the tape. The present invention also includes a particular method of forming the tape, applying the cover tape thereto and sectionalizing the tape. The present invention further includes a form of apparatus suitable for carrying out the method of the present invention.

Many uses exist for pressure sensitive tape which is suitable for laminating material. For example, in the packaging industry, it has been found highly advantageous to be able to apply packaging material directly to the surface of the products being packaged. Such is particularly true where transparent packaging material is utilized. A specific example of such a procedure is that of covering the exposed surfaces of ham sections which have been newly cut. The meat retailer can better display his products by exposing a cut surface of meat to his customers, thereby visually demonstrating to his customers the quality of his products. This is particularly true where hams are divided into sections. The exposed surface of the meat of the ham should properly be protected while on display. Normally, transparent wrapping material is applied to the freshly cut surface and fastened by various means to the rind or fat of the ham. Difficulties have been experienced in attaching the wrapping material to the outer surface of the ham. Pressure sensitive tape has been used to draw the wrapping material close against the exposed surface of the ham and thereby preserve its freshness but, in using conventional pressure sensitive tape, having only a single adhesive coated surface, the wrapping process cannot be neatly and efficiently carried out.

It is, therefore, proposed to form a double-face pressure sensitive tape having adhesive deposited on both faces and having cover tape positioned on the adhesive coatings to protect the adhesive coatings prior to the use of pressure tape. The cover tape is sectionalized and the abutting ends of each section extend parallel to one another out of contact with the adhesive coatings, thereby allowing easy removal of each section. The proposed method of forming such a tape as heretofore described is capable of efficiently forming the tape with the sectionalized cover tape as integral parts thereof. This method includes the forming of inverted U-shaped loops in the cover tape during the application of the cover tape to the adhesive coated surfaces of the base tape. By forming the loops so described, the cover tape may be readily sectionalized and each section readily removed. The method provides for continuous formation of the tape and no intermediate or subsequent operations are necessary.

The advantages of such a pressure sensitive tape include convenient storage of the doubly coated tape in the form of rolls without the tape adhering to adjacent segments of tape and the fast and efficient application of the tape to two distinct and separate surfaces to laminate the surfaces. Such advantages are readily apparent in the use of the tape of the present invention in attaching wrapping material to food products as previously described. By applying one surface of the doubly coated tape to the food product and the other surface to the inner surface of the wrapping material, proper seal can be maintained about the wrapping material and the exposed surface of the meat can be properly protected while still capable of being observed. In other words, in a specific application where a ham butt is removed from the main portion of the whole ham, the exposed surface of the butt can be displayed and protected by applying to the surface a transparent packaging material and laminating the edges of the packaging material to the sides of the ham butt by the use of the pressure tape of the present invention. Such a wrapping can be readily accomplished with little effort and an adequate seal can be maintained between the wrapping material and the product, thereby aiding in maintaining the freshness of the product.

Distinct advantages arise in utilizing the apparatus of the present invention in forming the pressure tape described above. As will be subsequently described, the apparatus is relatively simple in construction, inexpensive in operation and maintenance, and highly efficient. This apparatus includes novel features residing in a loop forming bar having a cutting blade housed therein which operates in conjunction with associated camming surfaces of the apparatus to sectionalize the cover tape after the tape has been supplied to the coated surfaces of the base tape. Loops are formed at spaced intervals by the bars along the length of the cover tape and the loops are subsequently split by action of the bars to allow the removal of the loop forming bars from close association with the inner surfaces of the cover tapes and the adhesive coatings.

Other advantages and purposes of the present invention will become apparent from the following detailed description made in conjunction with the drawings.

Figure 1:
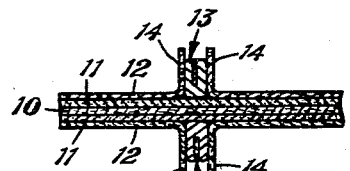
Figure 1 is a side elevation of a section of the double-face pressure sensitive tape of the present invention having the loop formers in operative association with the tape.
Figure 3:
Figure 3 is a top view in detail of one of the loop formers of the present invention.
Figure 2:
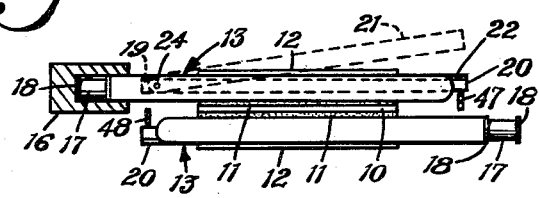
Figure 2 is a sectional view of the double-face pressure sensitive tape forming apparatus further showing the operation of the loop formers and taken along line 2—2 of Figure 5.

In Figure 1, a portion of a finished double-face pressure sensitive tape is shown as comprising a base tape 10 having two surfaces coated with layers of adhesive material 11. Positioned on the adhesive layers 11 are cover tapes 12. As shown in Figure 1, the cover tapes are sectionalized and between the adjacent ends of the two sections shown of both the top and bottom tape are loop formers 13. These loop formers or sectionalizing means 13 operate to form tabs 14 on the adjacent ends of each section. This operation is more clearly shown in Figures 2 and 3. Specifically referring to Figure 2, a view is shown with the loop formers or bars 13 positioned between the inner surfaces of the cover tapes 12 and the outer surfaces of the adhesive coatings 11. The loop formers or bunching means 13 are mounted on chains which are partially covered by chain guards 16, and which comprise spacers 17 and chain lengths 18. The chain lengths 18 directly support the loop formers 13 which extend through an open side in chain guards 16. The loop formers 13 have a slotted portion 19 as can be more clearly seen in Figure 3. Housed within this slotted portion 19 is a blade 20 which is mounted on shaft 24 and is capable of moving to a raised position as shown by the dotted lines 21 in Figure 2 and a lowered position as shown by the dotted lines 22 in the same figure. In Figure 3, spring 25 is suitably attached to the loop former 13 and the shaft 24 to urge the blade 20 within the slotted portion 19 and into its lowered position designated by the dotted lines 22 in Figure 2.

Figure 5:
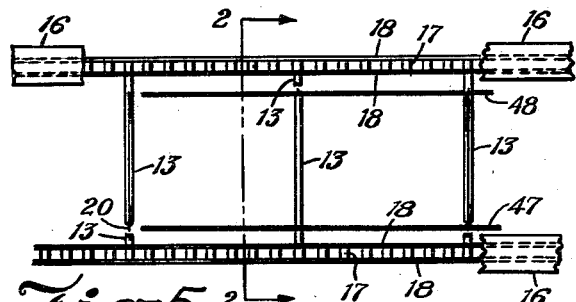
Figure 5 is a top view of a portion of the apparatus further disclosing in detail the operation of the loop formers and taken along line 5—5 of Figure 4.
Figure 4:
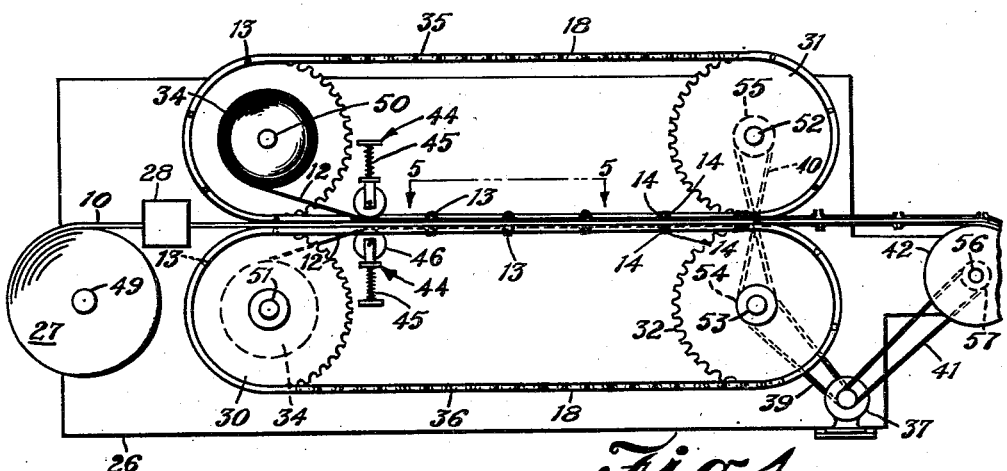
Figure 4 is a side elevation of the entire apparatus of the present invention.

In the operation of the loop formers in conjunction with the formation of the double-face pressure sensitive tape, reference is made to Figure 4 wherein the entire assembled apparatus is shown. This apparatus includes a suitable frame 26, which is schematically shown, on which is suitably mounted a base tape supply roll 27 and adhesive applier 28, sprockets 29, 30, 31, 32 and cover tape supply rolls 34. Supply roll 27 is mounted on shaft 49 while the sprockets 29, 30, 31, and 32 are mounted on shafts 50, 51, 52 and 53 respectively. These shafts are suitably journaled in frame 26 while the adhesive applier 28 is suitably supported by frame 26. The cover tape supply rolls 34 are mounted on shafts 50 and 51 along with sprockets 29 and 30. The rolls 34 are positioned so as to be mounted over or under the path of movement along which the tape is formed. The upper cover tape supply roll 34 mounted on shaft 50 is positioned ahead of sprocket 29 as the latter is positioned to the far side of the path of movement of the base tape 10. Similarly, sprocket 30 is positioned on the near side of the path of movement and, therefore, the cover tape supply roll mounted on shaft 51 is mounted behind sprocket 30. Thus, the cover tape supply rolls 34 are positioned so as to supply cover tape in the same vertical plane as the base tape 10 during the latter's movement through the apparatus. Mounted on the sprockets 29 and 31 is an upper chain conveyor 35. A lower chain conveyor 36 is similarly mounted on sprockets 30 and 32. The frame 26 also supports a motor 37 which operates drive belts 39, 40 and 41. The drive belt 39 extends from the motor 37 to the sprocket 32 about a pulley 54 mounted on shaft 53 while the drive belt 40 extends between the pulley 54 and a pulley 55 mounted on shaft 52. The drive belt 41 operates between the motor 37 and a collecting roll and tension supplying roll 42 which is mounted on shaft 56. The belt 41 extends to pulley 57 also on shaft 56 which is suitably journaled in frame 26. Also mounted on frame 26 are pressure means 44 which include springs 45 and rolls 46. These pressure means 44 are of conventional design, the rolls 46 being resiliently urged toward the assembled tape by the springs 45. Additional features of the apparatus shown in Figure 4 include the cams 47 and 48 which are hidden in Figure 4 but which can be seen in the view shown in Figure 5. Cams 47 and 48 are suitably mounted on frame 26 between the upper and lower chain conveyors 35 and 36 to cooperate with the protruding ends of the blades 20 mounted within the slotted portions 19 of the loop formers 13. The cams 47 and 48 will be more thoroughly described subsequently.

Figure 6:
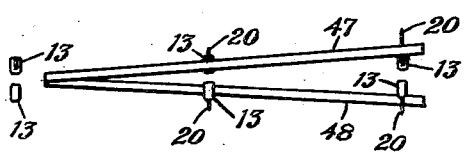
Figure 6 is a schematic showing of the operation of the camming bars forming a part of the apparatus of the present invention.

In the operation of the apparatus as described, attention is directed to Figure 4 wherein it can be seen that the motor 37 supplies power through belt 39 to sprockets 31 and 32 whereby the sprockets are rotated, the upper one 31 in a counter clock-wise direction and the lower one 32 in a clock-wise direction. Upper and lower chain conveyors 35 and 36 are moved in the same direction as their respective sprockets. This rotation of the sprockets 31 and 32 in turn causes the sprockets 29 and 30 to rotate in a similar manner thereby rotating the cover tape supply rolls 34 which are associated therewith. The base tape 10 is fed from base tape supply roll 27 by the rotation of the tension supplying and tape receiving roll 42 which is rotated in a clock-wise direction by belt 41. As the base tape 10 advances from the base tape supply roll 27, an adhesive is supplied to either one or both of the surfaces of the tape by the adhesive applier 28, which is shown schematically. This applier is of conventional design and is not shown in any great detail. The base tape 10 advances into contact with the loop formers 13 which are mounted on the upper and lower chain conveyors 35 and 36 respectively, as previously described in connection with Figure 2. The loop formers 13 contact the adhesive coating on both surfaces and maintain this contact with the coated base tape as the latter advances through the apparatus. Following the contact of the loop formers 13 with the coated base tape 10, cover tape 12 is introduced into contact with the coated surface of base tape 10 and the loop formers 13. The association of the cover tape is brought about by the feeding of the cover tape 12 from the cover tape supply rolls 34 as previously described. The close association of the cover tape 12 with the adhesive surfaces of the base tape 10 is brought about by the pressure means 44. These pressure means include the rolls 46 which are yieldingly forced against the cover tape by means of springs 45. The springs allow the rolls to yield to the loop formers when the loop formers are passed between the rolls. The pressure means thereby bring the cover tapes 12 into close association with the loop formers 13. As a result, a loop or inverted U is formed in the cover tape having the loop formers embedded within the loop. As the loop formers 13, cover tapes 12 and base tape 10 advance, the cams 47 and 48 operate to move the blades 20 within the loop formers 13 out of the slots 19 to cut the loops and thereby sectionalize the cover tape and free the loop formers 13 from the loops. The manner in which this is accomplished can be readily seen in the diagrammatic view of Figure 6 wherein the cams 47 and 48 are shown in operative position which is somewhat exaggerated so as to more clearly illustrate the camming operation. There are two cams, one of which is tilted upwardly while the other is tilted downwardly. The upper cam 47 is positioned (see Figure 5) to operate the loop formers 13 attached to the upper chain conveyor 35 while the cam 48 operates the loop formers 13 attached to the lower chain conveyor 36. As previously stated, the blades 20 housed in the slotted portions 19 of the loop formers 13 are urged by springs 25 into the slotted portion. The ends of the blades 20 extend beyond the body of the loop formers and cooperate with the cams 47 and 48 when contact is made. As the loop formers 13 advance, the angled cams 47 and 48 operate to raise the blades 20 against the springs 25 by contacting the ends thereof. The blades 20 rotate about the shafts 24 and eventually reach the raised position shown by the dotted lines 21 in Figure 2. Upon reaching this position the blades sever the portion of the cover tapes directly above them so as to divide the cover tapes into sections. Following the severing operation, the loop formers 13 are free to move out of contact with the cover tape 12 and the adhesive coated base tape 10. This is accomplished by the reaching of the end of the run by the loop formers and the raising or lowering of them, depending on the conveyor being observed by the sprockets 40 and 39. Meanwhile, the finished double-face pressure sensitive tape is collected on the tension supplying and tape receiving roll 42. The adjacent ends 14 of each section of the cover tape are flattened by the rolling up of the tape on the roll 42 but are sufficiently long to remain free from contact with the adhesive coatings on the base tape 10. The freedom of these tabs 14 allow ready removal of each section of cover tape upon subsequent use of the pressure sensitive tape.

The shape of the loop formers 13 may vary depending on the amount of space desired between the tabs 14. As shown in Figure 1, the loop formers 13 are oblong in shape. The thickness of the loop formers 13 and the distance between the tabs 14 are somewhat exaggerated in Figure 1 to better show in detail the type of loops formed in the cover tape 12. The spacing of the loop formers 13 along the upper and lower chain conveyors 35 and 36, respectively, may obviously vary depending upon the length of cover tape sections desired. The adhesive coating may be applied solely to one surface of the base tape, if so desired. The apparatus of the present invention is fully capable of forming a single sided pressure sensitive tape. In referring to Figure 4, it can be readily seen that the cover tape supply roll 34 associated with the sprocket 30 may be taken out of operation and the apparatus operated as previously described with the exception that only a single surface, in this particular instance the top surface, of the base tape 10 being coated with adhesive.

The apparatus of the present invention is fully capable of automatically forming a double-face pressure sensitive tape having sectionalized cover tape applied to the coated surfaces thereof. Such a tape can be readily stored on rolls and easily removed therefrom without adherence having occurred between the layers of the tape on the roll. Such a tape can be efficiently applied to laminate surfaces as the sectionalized cover tape on both faces of the pressure tape can be readily removed.

Obviously, many modifications and variations of the invention as hereinbefore set forth may be made without departing from the spirit and scope thereof, and therefore only such limitations should be imposed as are indicated in the appended claims.

I claim:

1. A method of forming pressure sensitive tape which comprises: coating a surface of a flexible tape with adhesive, depositing cover tape on said surface, bunching said cover tape at spaced intervals during the depositing thereof, and thereafter dividing said cover tape at the bunched intervals into sections.

2. A method of forming double-face pressure sensitive tape which comprises: coating at least two surfaces of a flexible tape with adhesive, depositing covering material on the coated surfaces, looping said covering material to form an inverted U at spaced intervals during the depositing thereof, and thereafter dividing said covering material into unconnected sections by separating each inverted U into two segments.

3. A method of forming pressure sensitive tape which comprises: coating a portion of flexible tape with adhesive, depositing a covering on the coated portion, looping the covering to form an inverted U at spaced intervals during the depositing thereof, and thereafter dividing said covering into sections by separating each inverted U into segments.

4. A method of forming pressure sensitive material which comprises: coating a surface of a base material with adhesive, depositing covering material on the coated surface, bunching said covering material to form an inverted U and thereafter dividing the inverted U at a point along the arcuate portion thereof.

5. A method of forming double-face pressure sensitive tape which comprises: coating at least two surfaces of a flexible tape with adhesive, depositing covering tape on the coated surfaces, bunching said covering tape to form an inverted U at spaced intervals during the depositing thereof, and thereafter dividing each inverted U into two segments at a point along the arcuate portion thereof.

References Cited in the file of this patent
UNITED STATES PATENTS

| | | |
|---|---|---|
| 2,050,191 | Liebowitz | Aug. 4, 1936 |
| 2,292,024 | Dreher | Aug. 4, 1942 |
| 2,303,087 | Neller | Nov. 24, 1942 |
| 2,414,739 | Heygel | Jan. 21, 1947 |
| 2,552,664 | Burdine | May 15, 1951 |
| 2,560,566 | Graves | July 17, 1951 |
| 2,688,582 | Phair | Sept. 7, 1954 |